US006421679B1

United States Patent
Chang et al.

(10) Patent No.: US 6,421,679 B1
(45) Date of Patent: *Jul. 16, 2002

(54) CONCURRENT PATCH TO LOGICAL PARTITION MANAGER OF A LOGICALLY PARTITIONED SYSTEM

(75) Inventors: Karen Udy Chang, Schaumburg, IL (US); Roger Eldred Hough, Austin, TX (US); Jeffrey Paul Kubala, Poughquag, NY (US); Steven Messinger, Poughkeepsie, NY (US); Michael Burrill Phillips, Pleasant Valley, NY (US); Ira Glenn Siegel, New Paltz, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/550,121

(22) Filed: Oct. 27, 1995

(51) Int. Cl.$^7$ .............................................. G06F 17/00
(52) U.S. Cl. .................. 707/103 R; 709/313; 709/319; 707/103 F
(58) Field of Search ................. 395/680, 681, 395/682; 709/300, 301, 302, 310–332; 707/1–206

(56) References Cited

U.S. PATENT DOCUMENTS

| 4,028,679 A | 6/1977 | Divine ........................ 711/115 |
| 4,028,683 A | 6/1977 | Divine et al. ................ 711/115 |
| 4,028,684 A | 6/1977 | Divine et al. ................ 711/115 |
| 4,141,068 A | 2/1979 | Mager et al. ................ 711/103 |
| 4,319,343 A | 3/1982 | Powell ........................ 365/196 |
| 4,542,453 A | 9/1985 | Patrick et al. .................. 714/8 |
| 4,564,903 A | 1/1986 | Guyette et al. ................ 463/31 |
| 4,603,399 A | 7/1986 | Cheek et al. ................ 711/202 |
| 4,843,541 A | 6/1989 | Bean et al. .................... 710/36 |
| 5,204,960 A | 4/1993 | Smith et al. ................. 717/145 |
| 5,339,430 A | * 8/1994 | Lundin et al. ............... 395/712 |
| 5,359,730 A | * 10/1994 | Marron et al. ............... 395/712 |
| 5,367,683 A | * 11/1994 | Brett ........................... 395/712 |
| 5,379,429 A | * 1/1995 | Hirasawa et al. ........... 395/712 |
| 5,410,703 A | * 4/1995 | Nilsson et al. ............... 395/712 |
| 5,421,017 A | * 5/1995 | Scholz et al. ................ 395/712 |
| 5,481,713 A | * 1/1996 | Wetmore et al. ............ 395/712 |
| 5,537,598 A | * 7/1996 | Kukula et al. ............... 395/712 |
| 5,594,857 A | 1/1997 | King et al. .................. 345/783 |

FOREIGN PATENT DOCUMENTS

| GB | 2 043 308 A | 8/1979 |
| JP | 3-192947 | 8/1991 |
| JP | 7-152575 | 6/1995 |
| WO | WO 94/27219 | 11/1994 |

OTHER PUBLICATIONS

"A Compiler for Program Patches" by A. Marron, Research Disclosure, Nov. 1992, No. 343, Kenneth Mason Publications Ltd., England.
"Attributed Transformational Code Generation for Dynamic Compilers" by Boyland et al., Code Generation–Concepts, Tool, Techniques, Proceedings of The International Workshop–1992, pp. 227–254.

* cited by examiner

*Primary Examiner*—David Jung
(74) *Attorney, Agent, or Firm*—William A. Kinnaman, Jr.

(57) ABSTRACT

A method of replacing a current version of a program module with a replacement version of the module concurrently with the execution of the program on a computer system. For each entry point within the current version of said module to which the program may make address reference, a corresponding entry point within the replacement version of the module is determined. While execution of the program is suspended, each address reference in the program to an entry point within the current version of the module is replaced with an address reference to the corresponding entry point within the replacement version of the module. Execution of the program is resumed when each address reference to the current module has been replaced with one to the replacement module.

5 Claims, 7 Drawing Sheets

CONCURRENT PATCH TO LOGICAL PARTITION MANAGER OF A LOGICALLY PARTITIONED SYSTEM

BACKGROUND OF THE INVENTION

1. Field of the Invention

This invention relates to a method of applying patches to computer program code concurrently with its execution on a machine and, more particularly, to a method of applying such concurrent patches to the logical partition manager of a logically partitioned system.

2. Description of the Related Art

Logically partitioned computer systems are well known in the art. Examples of such logically partitioned systems are described in U.S. Pat. No. 4,564,903 issued to Guyette et al. and U.S. Pat. No. 4,843,541 issued to Bean et al., as well as in the copending application of applicant Jeffrey P. Kubala, Ser. No. 08/335,609, now U.S. Pat. No. 5,564,040 filed Nov. 8, 1994, entitled "Apparatus and Method for Establishing Server Mode Partitions in a Logically Partitioned Data Processing System", the specifications of which are incorporated herein by reference. Commercial embodiments of logically partitioned systems include those sold by the assignee of this application under the trademarks Processor Resource/Systems Manager and PR/SM.

Logical partitioning allows the establishment of a plurality of system images within a single physical computer system. Each system image, in turn, is capable of operating as if it were a separate and independent computer system. That is, each logical partition can be independently reset, initially loaded with an operating system that is potentially different for each logical partition, and operate with different software programs using different input/output (I/O) devices. Logical partitioning is in common use today because it provides its users with flexibility to change the number of logical partitions in use and the amount of physical system resources assigned to each partition, in some cases while the entire system continues to operate.

Computer users have long had a need for continuous non-disrupted operation. Activation of logical partition manager patches has, until now, required a power-on reset (POR), thereby disrupting system operation. It would be desirable, however, to have a means for applying program patches to logical partition manager code concurrently with its execution.

Concurrent patches have been previously applied to various types of computer system code. However, the conditions under which they are applied cannot be readily extended to the logical partition manager. Thus, central processor microcode patch is implemented by varying off one central processor at a time, updating the microcode for that central processor and varying it back on. A logical partition manager cannot do this because there is only one instantiation of logical partition manager microcode, not one per central processor. Also, central processor microcode cannot be patched on a uniprocessor without causing disruption of existent work load.

Channel and input/output (I/O) processor (IOP) microcode both maintain a second copy of their code which is updated during a concurrent patch. This is expensive in terms of storage. Also, the logical partition manager is unable to use this method because of its work queues and tables, which would have to be rebuilt in their entirety before switching to another copy of logical partition manager.

SUMMARY OF THE INVENTION

The present invention contemplates a method of replacing a current version of a program module with a replacement version of the module concurrently with the execution of the program on a computer system. For each entry point within the current version of said module to which the program may make address reference, a corresponding entry point within the replacement version of the module is determined. While execution of the program is suspended, each address reference in the program to an entry point within the current version of the module is replaced with an address reference to the corresponding entry point within the replacement version of the module. Execution of the program is resumed when each address reference to the current module has been replaced with one to the replacement module.

The present invention thus allows currently executing tasks to continue execution. Although the present invention is generally useful for applying concurrent patches to program code, it is especially useful for applying concurrent patches to the code of a logical partition manager, which exists in only one instantiation and does not have a backup copy. There is no disruption of tasks being executed by either the logical partitions or the logical partition manager. While a multiprocessor environment is described, logical partition manager or other program code concurrently patchable on a uniprocessor.

BRIEF DESCRIPTION OF THE DRAWINGS

FIG. 8 (comprising FIGS. 8A–8C) shows the synch-up procedure executed by each central processor in response to being signaled by the logical partition manager

Description of the Preferred Embodiments

Introduction

Figure 1:
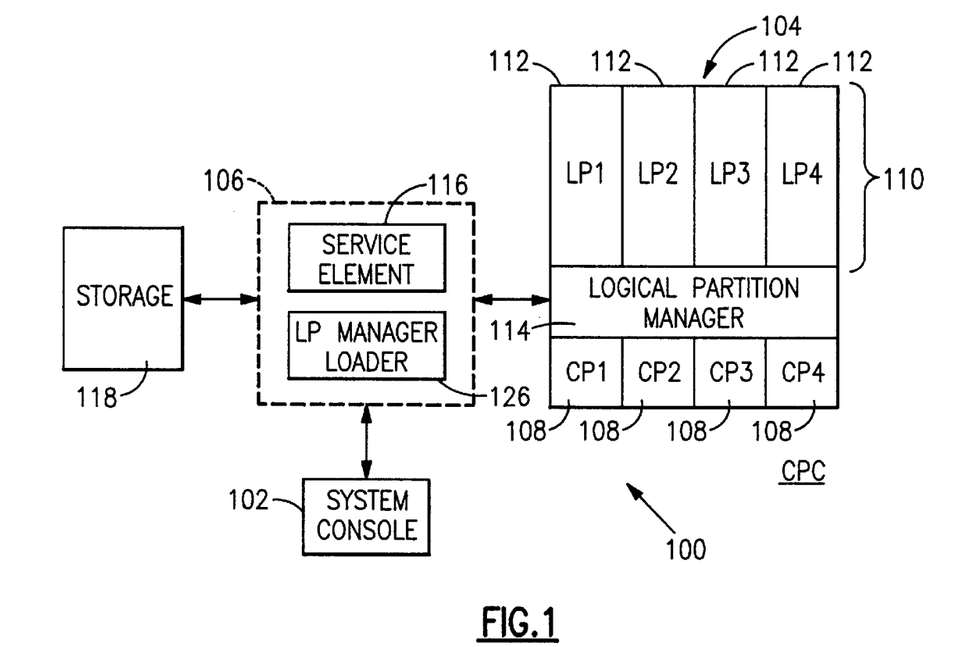
FIG. 1 is a schematic block diagram of a computer system incorporating the present invention.

Referring to FIG. 1, a computer system 100 incorporating the present invention comprises a system console 102 which is attached to a central processing complex (CPC) 104 via a service processor (SP) 106.

System console 102 may comprise either a non-programmable terminal or a programmable workstation (PWS) such as a personal computer. System console 102 is the point from which the system operator enters commands and otherwise interacts with the system 100.

Central processing complex 104 contains one or more central processors (CPs) 108, an exemplary four of which (CP1–CP4) are shown, and main memory 110 for system 100. As is described more fully in the patents and application referred to above, central processing complex 104 is divided into one or more logical partitions (LPs) 112, an exemplary four of which (LP1–LP4) are shown, which are managed by a logical partition manager 114. Logical partition manager 114 and logical partitions 112 each comprise one or more programs residing in respective portions of system main memory 110. As noted above, from the standpoint of the programs residing in the logical partitions 112, each logical partition effectively functions as a separate hardware machine and has its own operating system (not separately shown), which may differ for each logical partition.

Central processing complex 104 is connected to user-accessible storage, comprising one or more direct access storage devices (DASD) such as magnetic disk drives, for permanent storage of the programs residing in the logical partitions 112, as well as to other peripheral input/output (I/O) devices (not shown).

Service processor 106 interfaces between the system console 102 and the central processing complex 104. Service processor 106 contains a virtual machine known as a service element (SE) 116 for interfacing with central processing complex 104. Service processor 106 is connected to non-user-accessible storage 118, comprising one or more direct access storage devices (DASD), for permanent storage of the programs making up the logical partition manager 114.

Prior-Art Patch Application

As a preliminary to describing the application of concurrent patches in accordance with the present invention, a method of patch application previously used in logically partitioned systems will be described.

Figure 2:
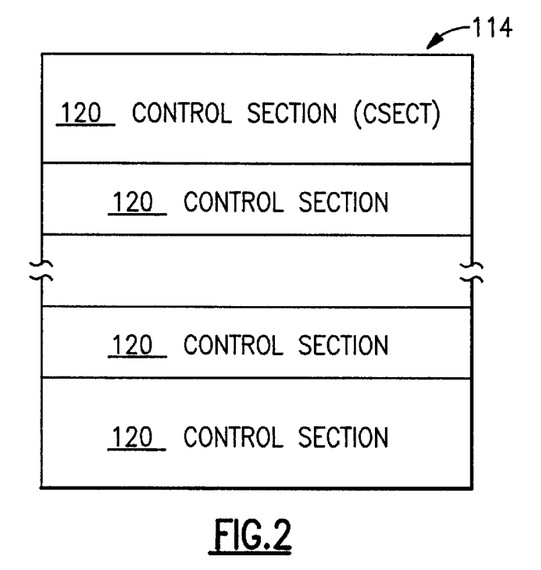
FIG. 2 shows the individual program modules or control sections (CSECTs) making up the nucleus of the logical partition manager.

Referring to FIG. 2, logical partition manager 114 is composed of a plurality of individually compilable modules 120 referred to as control sections (CSECTs); there may be several hundred such modules in a typical system.

Figure 5:
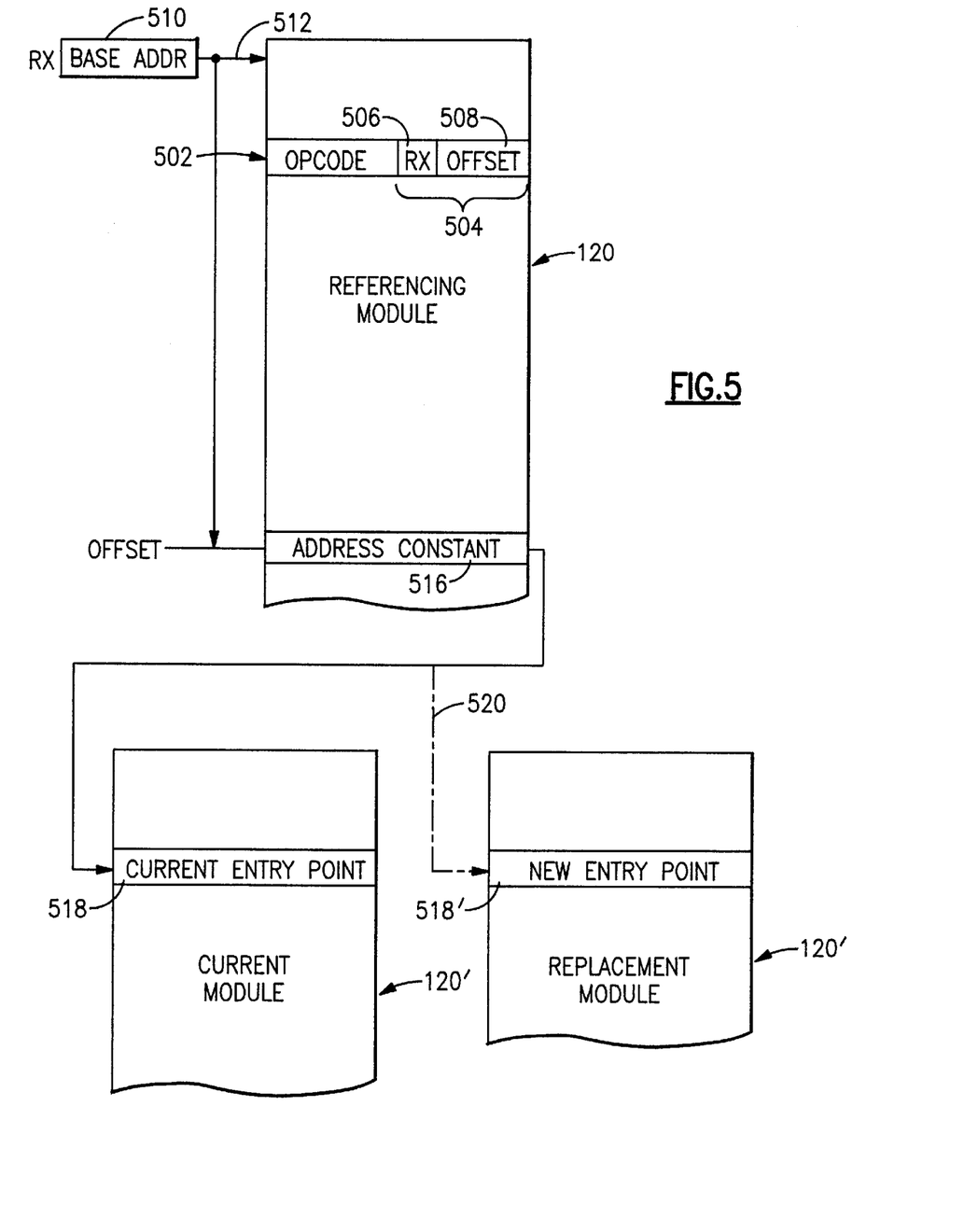
FIG. 5 shows address references to entry points within the program modules.

Each control section 120 may contain one or more entry points to which control of program execution may pass from another control section, through the use of an appropriate branch instruction or the like containing an address reference to the entry point. FIG. 5 shows a first module 120 (referred to as a referencing module) making an address reference to a current version 120' of a referenced module. A referencing instruction 502 in module 120 may contain an operand field 504 comprising a register field 506 and an offset field 508. Register field 506 identifies a general register 510 containing the base address 512 of the referencing module 120. Offset field 508 contains the offset (relative to the base address 512) of a location in referencing module 120 containing an address constant (ADCON) 516. Address constant 516 in turn points to an entry point 518 in the current version 120' of the referenced module that is referenced by instruction 502 (through the pointer scheme described).

Prior to build, the address constants are unresolved, since the address references are to entry points 518 external to the referencing module 120. The locations are updated at build time with the addresses of the entry points 518 when these addresses become known, as described below.

Figure 3:
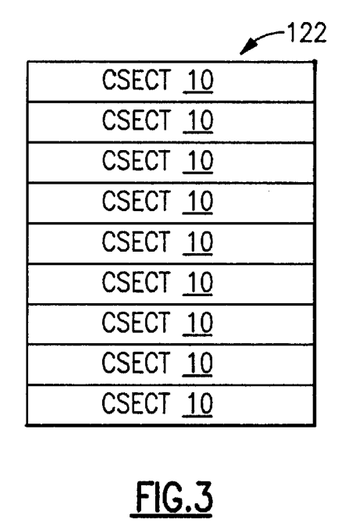
FIG. 3 shows a load list used by the logical partition manager loader.
Figure 4:
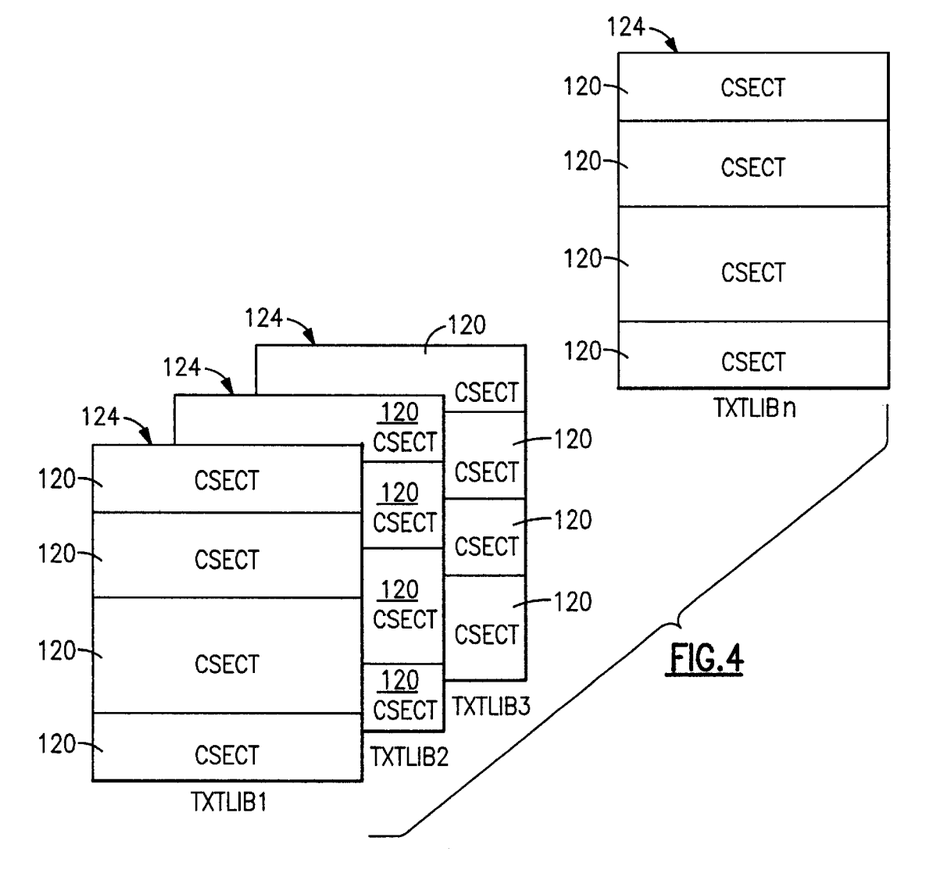
FIG. 4 shows the text libraries (TXTLIBs) used by the logical partition manager loader.

A logical partition manager loader 126 (FIG. 1) residing in service processor 106 along with service element 116 builds the logical partition manager 114 in service processor memory from control sections 120. Referring to FIG. 3, a load list 122 residing in the service processor 106 specifies the inclusion and order of the control sections 120 which form the nucleus (i.e., executable portions) of the logical partition manager 114. Referring to FIG. 4, at build time logical partition manager loader 126 searches a series of sequentially numbered text libraries (TXTLIBs) 124 (up to 15 in a typical implementation), in descending order, for the first occurrence of each control section 120 mentioned in the load list 122. Logical partition manager loader 126 links these control sections 120 together, creating a loadable entity forming the nucleus of the logical partition manager 114. This loadable entity 114 is stored in service processor storage 118, from which it is later loaded into main memory 110 at subsequent power-on resets (PORs) as a preliminary to its execution.

During this build process, the logical partition manager loader 126 builds a relocation dictionary to resolve all address constants 516 referring to, for example, entry points 518 within referenced control sections 120' described in its load list 122. As well, the loading offset (i.e., the location of the base address of loadable entity 114 in main memory 110) is added to all address constants (ADCONs) 516 so that their resolution is correct to the final destination.

Patches replace one or more entire control sections 120' with replacement sections 120" (FIG. 5). Accordingly, all address constants 516 referring to entry points 518 within the control sections 120' being replaced are replaced with references to the corresponding entry points 518' in the replacement control sections 120". In the prior art, to replace a control section 120', a modified source code version of the control section is compiled and the resultant object code version (referred to herein as a text deck) 120" replaces the original control section 120' in a text library 124. The patched control section 120" will be incorporated into the new logical partition manager nucleus 114. This patched logical partition manager nucleus 114 is then loaded into main memory 110 at subsequent power-on resets. This method cannot be used to replace control sections 120' of a currently executing logical partition manager 114.

Concurrent Patch Application

Figure 6:
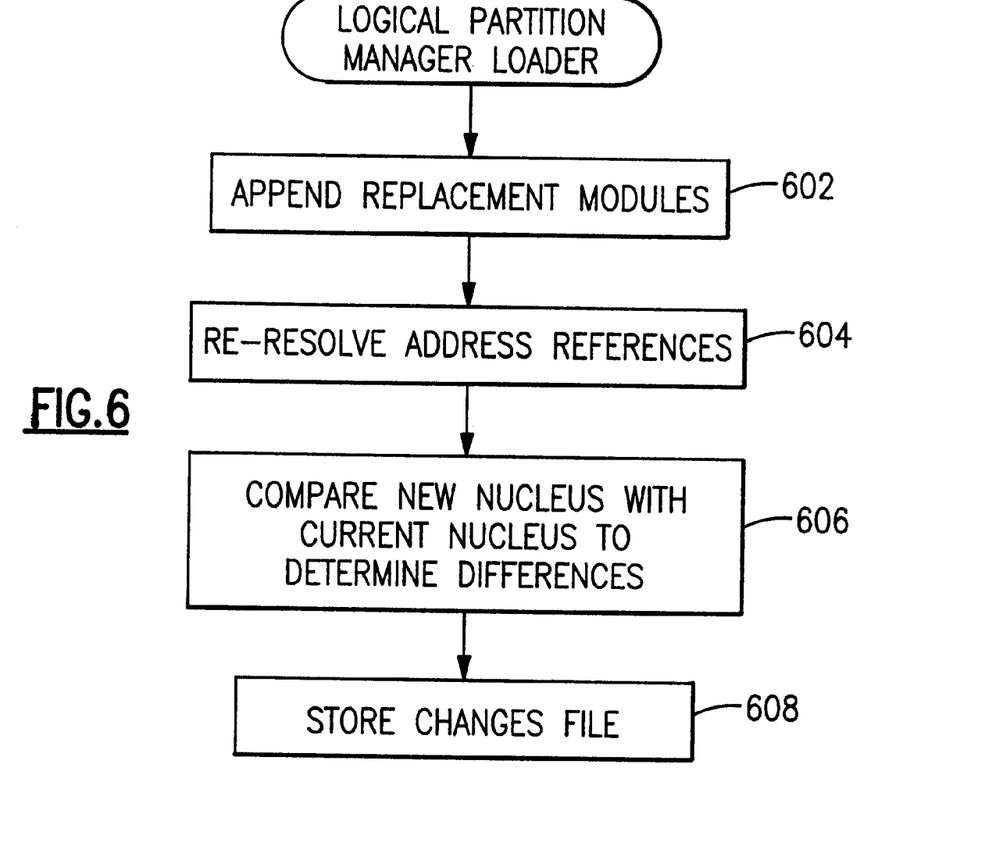
FIG. 6 shows the steps performed by the logical partition manager loader when applying concurrent patches to the logical partition manager in accordance with the present invention.

FIG. 6 shows the steps performed by the logical partition manager loader 126 when applying concurrent patches to the logical partition manager 114 in accordance with the present invention.

In accordance with the present invention, the text deck 120" created from a modified source code version of a control section is added to another library residing in the service processor 106 rather than to the original text library 124. The new member 120" is uniquely identified and specified in a separate patch load list residing in the service processor 106.

The logical partition manager loader 126 builds the original logical partition manager nucleus 114 and appends the replacement modules 120" to the original nucleus (step 602). The logical partition manager loader then re-resolves all external references such as address constants 516 from entry points 518 in control sections 120' to entry points 518' within the replacement control sections 120", as shown by the broken line 520 in FIG. 5 (step 604). Note that only the address constants 516 are updated; the contents of the original operand fields 506 and 508 remain unchanged.

The prior art version of the logical partition manager loader 126 discussed above disallowed duplicate definitions of external symbols. In accordance with the present invention, the logical partition manager loader 126 is modified to accept duplicate definitions of external symbols introduced via patch. When all references 504 are finally resolved, they will all use the address of the latest definition of a symbol (i.e., the address constant 516 of the replacement entry point 518').

The logical partition manager loader 126 then does a byte-for-byte compare of a copy (from storage 118) of the logical partition manager nucleus 114 currently executing in main memory 110 with the nucleus just created by the patch process (step 606). The logical partition manager loader 126 determines the differences, which may include (1) new or replacement control sections 120" to be added to the end of the current nucleus 114; and (2) the addresses and new values of changed portions of the logical partition manager nucleus 114, including changed address constants 516, and saves them in a file in storage 118 (step 608).

Figure 6A:
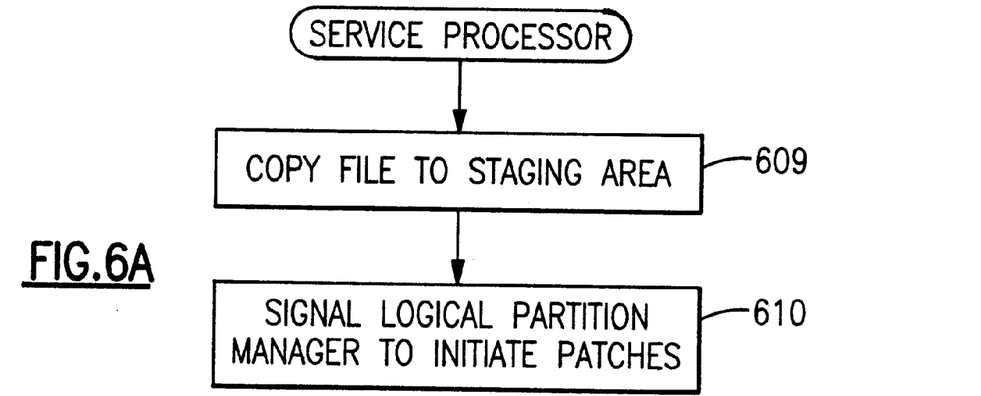
FIG. 6A shows the steps performed by the service processor when applying concurrent patches to the logical partition manager in accordance with the present invention.

Referring now to FIG. 6A, service processor 106 (acting through service element 116) then stores this file in a staging area in logical partition manager storage in main memory 110 (step 609). Service processor (through service element 116) then signals the logical partition manager 114 to inform it of the need to initiate application of the patch (step 610).

Figure 7:
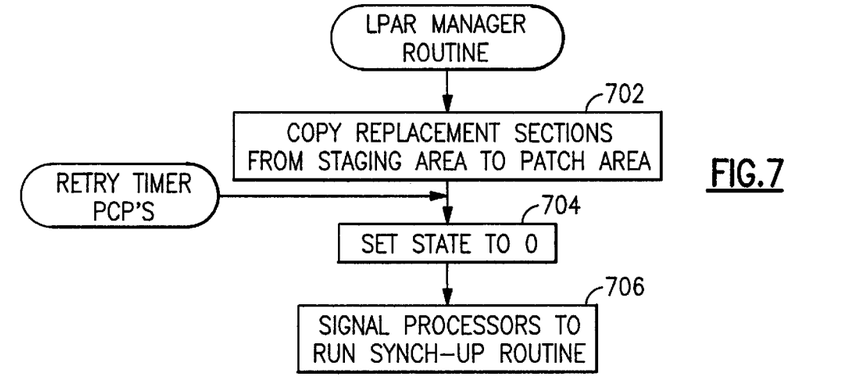
FIG. 7 shows the steps performed by the logical partition manager in response to being signaled by the service processor to apply a concurrent patch.

FIG. 7 shows the steps performed by the logical partition manager 114 in response to being signaled by the service processor 106 to apply a concurrent patch. Upon being signalled by service processor 106, logical partition manager 114 first moves new or replacement control sections 120" from the staging area to storage adjacent to the current logical partition manager nucleus 114 (step 702). The logical partition manager 114 then sets a state indicator to 0 (step 704) and signals the central processors 108 to suspend their normal work and run a special synch-up routine (FIG. 8) described below (step 706). This causes all the central processors (CPs) 108 to gather in 'safe' code, and selects one central processor to make the necessary updates. As described below, a series of states (beginning with state 0) are used to keep track of allowable actions by each central processor 108 during the synch-up, apply updates process. This pause of the central processors 108 will last at most 10 milliseconds, thereby ensuring that input/output (I/O) overruns do not occur.

As described below, the selected central processor 108 concurrently updates address constants 516 in the logical partition manager nucleus 114 referring to replaced entry points 518, causing redirection to the replacement entry points 518' when they are referenced. While changed portions of the logical partition manager nucleus 114 (for example, address references 516 to externally defined entry points 518) are updated, existing work chains are not disrupted other than by the brief central processor pause.

Patch application preserves replaced control sections 120', so that a previously initiated thread of execution of a superseded control section 120' may run concurrently with a newly initiated thread of execution of the replacement control section 120". Only threads that have branched to control section 120' (or have loaded an ADCON 516 to control section 120' in preparation for a branch to that control section) before suspension of execution will continue to execute in that section of code. Subsequently executing threads, upon encountering a branching instruction 502 pointing to a updated address constant 516, will branch to the new entry point 518' in the replacement control section 120".

Patch backout is realized by initiating a patch session with a patch load list excluding the patches to be backed out. The file delineating changed portions of the logical partition manager nucleus 114, for example address constants 516, is created by the logical partition manager loader 126 and used in like manner to a patch application. Concurrent patch backout differs from concurrent patch application in that address references 516 and the like in the control sections 120" constituting the backed out patches are updated as well. That is to say, not only are replaced address constants 516 in the original logical partition manager nucleus 114 reinstated, but address constants in the replacement modules 120" that refer to entry points 518' in other replacement modules 120" are replaced with address constants that refer to the corresponding entry points 518 in the original modules 120'.

Figure 8A:
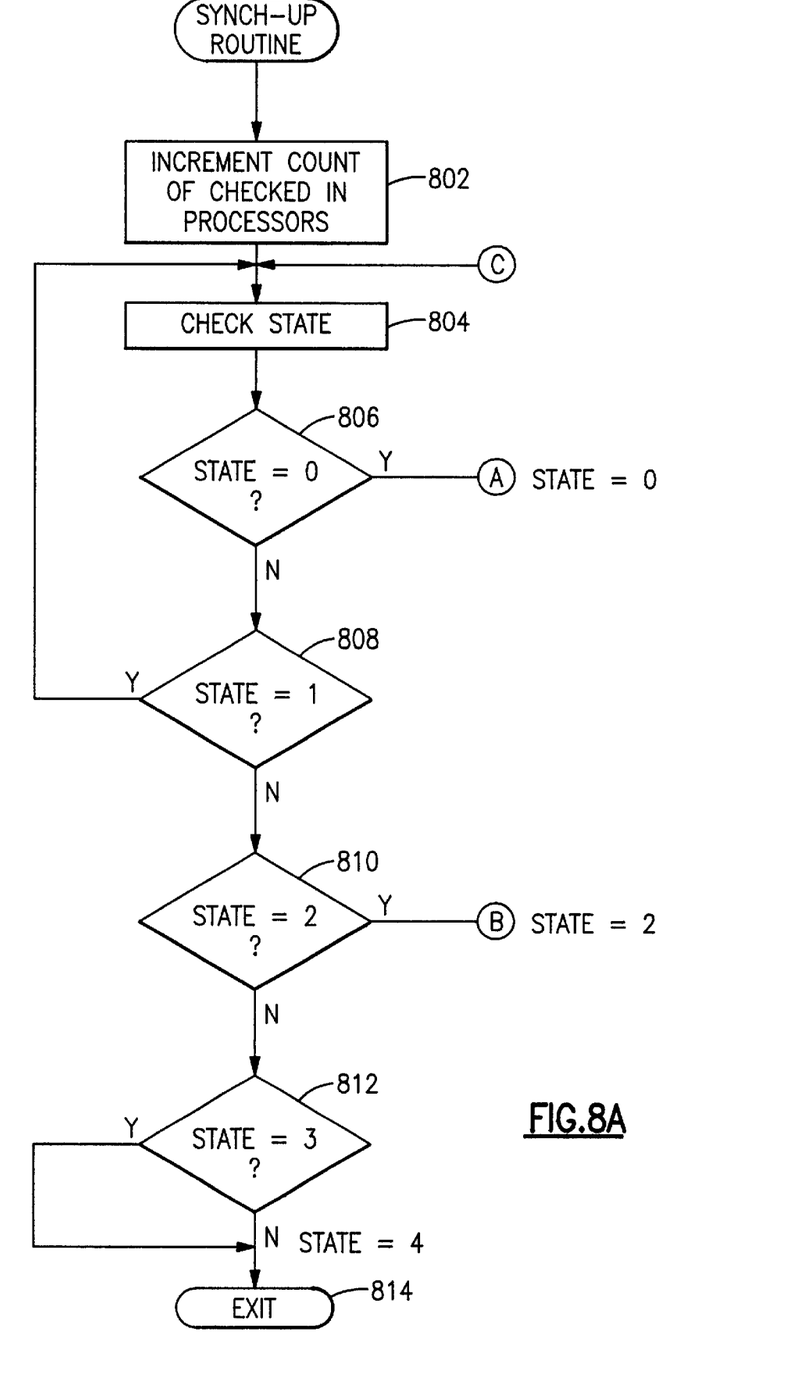
Figure 8B:
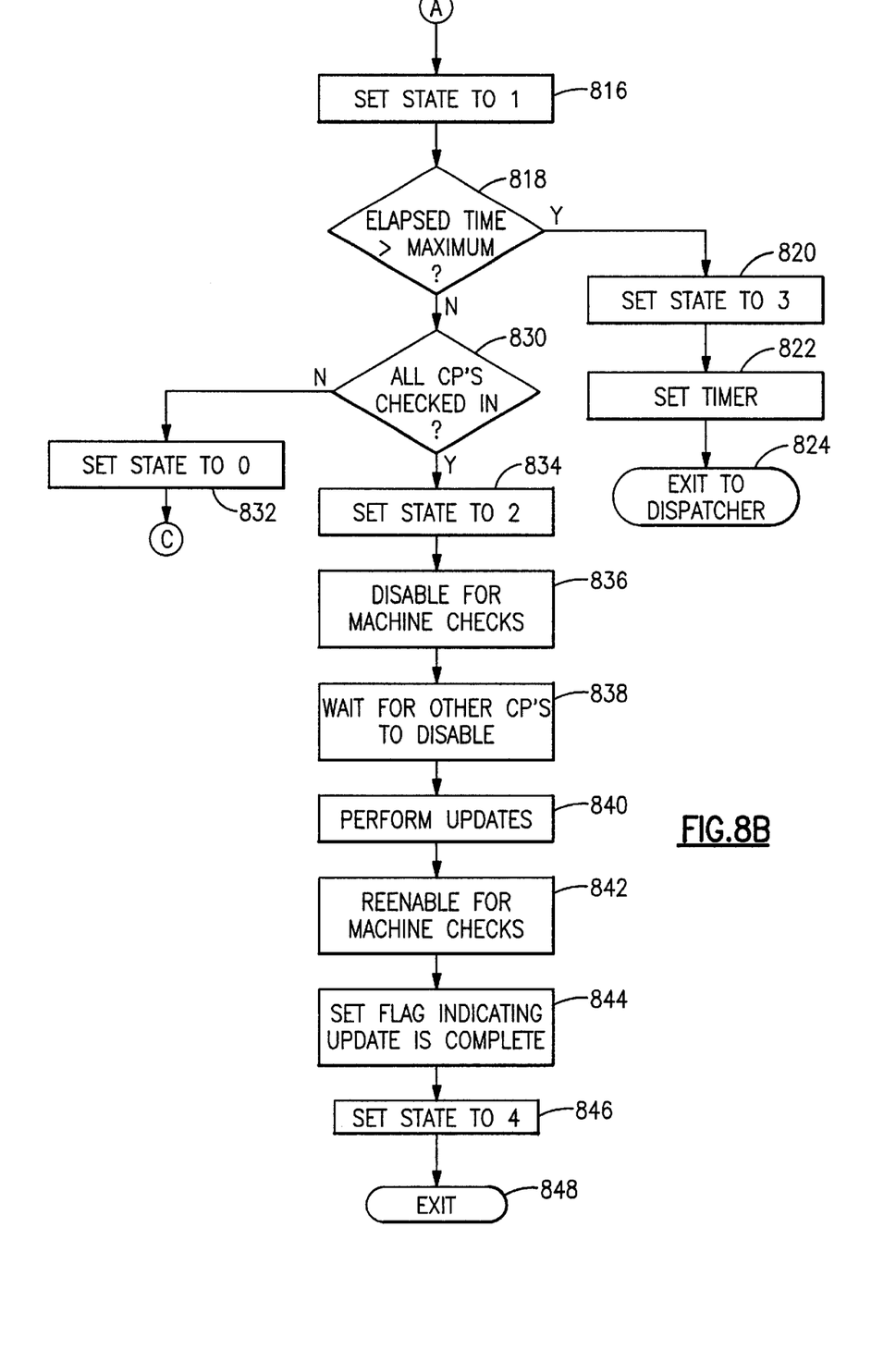
Figure 8C:
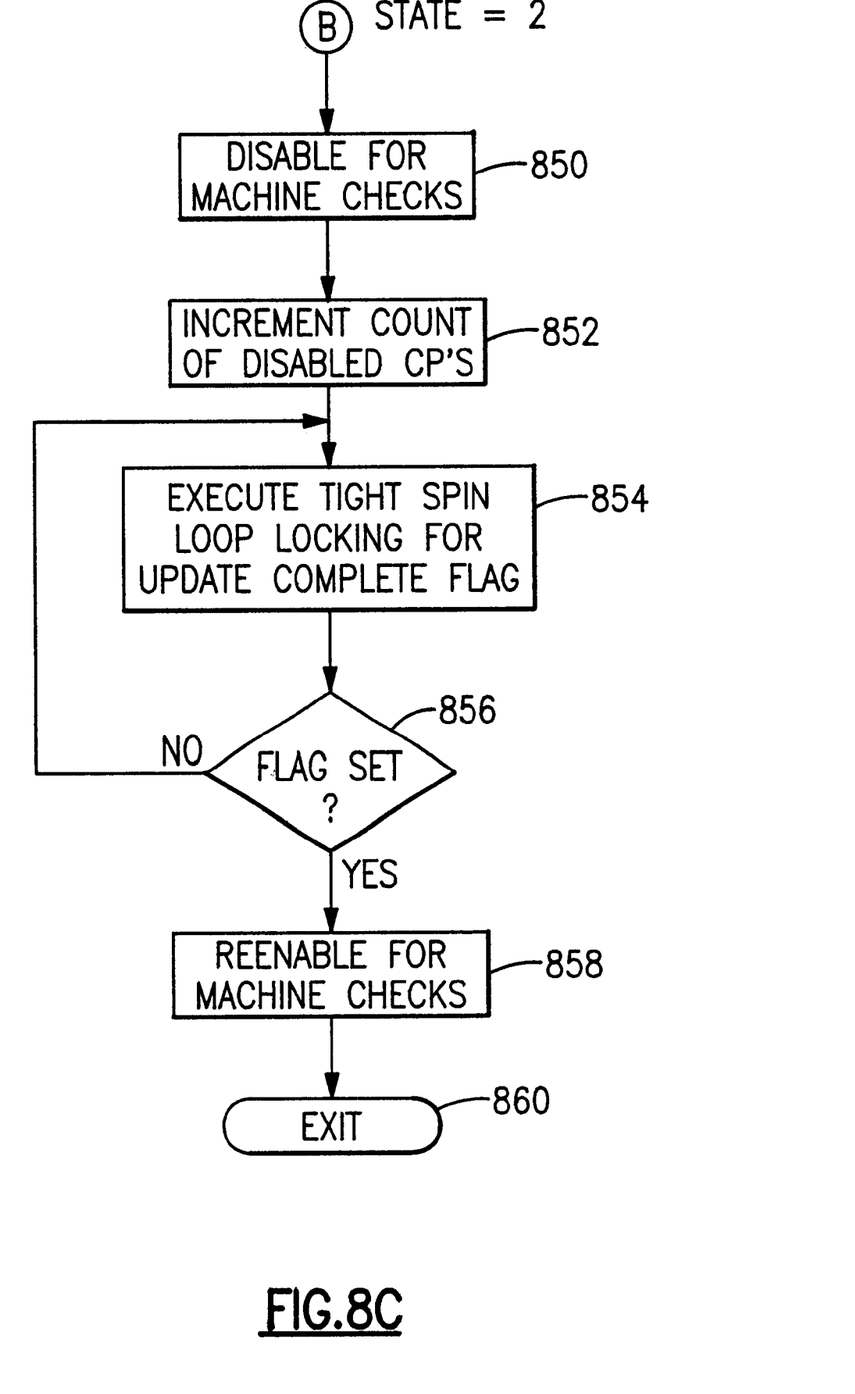

FIG. 8 shows the synch-up procedure executed by each central processor 108 in response to being signaled by the logical partition manager 114 at step 706. Upon entering this routine, each central processor 108 increments a count of "checked-in" processors (step 802) and checks the current state (step 804). The synch-up procedure starts from a base state of 0, which may be altered, however, by the actions of other central processors 108 as described below.

If central processor 108 detects a state of 0 (step 806), it updates the state to 1 (step 816) and checks to see if the elapsed time from the attempt to signal the central processors to run synchronize code is greater than the maximum time to allow the central processors to respond (step 818). If so, the central processor 108 sets the state to 3 (step 820), sets a retry timer to pop in 100 milliseconds (step 822) and exits to the dispatcher (step 624). When the retry timer pops (FIG. 7), the central processor sets the state to 0 (step 704) and reinitiates the attempt to synchronize the central processors (step 706).

If the predetermined maximum time has not elapsed, the central processor 108 checks for the arrival of all central processors at the synch-up code by checking the count incremented by each central processor at step 802 (step 830). If the central processors 108 have not all checked in, the central processor resets the state to 0 (step 832) and loops back to the point in the routine where it checks the state (step 804).

If all the central processors 108 have checked in quickly enough, the central processor sets the state to 2 (to indicate to the other central processors that it is updating the changed portions of the logical partition manager nucleus 114) (step 834), disables for machine checks (step 836) and waits until all other central processors have disabled for machine checks (step 838). When all central processors 108 have disabled for machine checks, the central processor updates all changed portions of the logical partition manager nucleus 114, for example address constants 516 referring to replaced entry points 518 (step 840). After all updates are completed, the central processor 108 reenables for machine checks (step 842), sets a flag indicating that updating is complete (step 844), and sets the state to 4 (step 846) before exiting (step 848).

A state of 1 indicates that another central processor 108 is in the middle of checking for central processor synch-up. If it detects this state (step 808), a central processor 108 checks the state again (step 804).

A state of 2 indicates that another central processor 108 is updating changed portions of the logical partition manager nucleus 114. If it detects this state (step 810), a central processor 108 disables for machine checks (step 805), increments the count of central processors disabled for machine checks (step 852) and executes a tight spin loop in a "safe" place looking for the flag indicating that the updates are complete (step 854). Once the flag indicating that the updates are complete is set (step 856), the central processor 108 reenables for machine checks (step 858) and exits to the dispatcher, which causes the interrupted tasks to resume (step 860).

A state of 3 indicates that another central processor 108 has determined that the central processors failed to synch up quickly enough. If it detects this state (step 812), a central processor 108 exits to the dispatcher (step 814).

A state of 4 indicates that another central processor 108 has finished performing necessary updates. If it detects this state (step 812), a central processor 108 exits to the dispatcher (step 814).

In addition to replacement modules, the present invention may also be used to add new modules having no previous counterpart concurrently with the execution of the program. This could be done by replacing an original module with a replacement module that makes reference to (as by calling) the newly created module.

Various modifications of the present invention will be apparent to those skilled in the art. Thus, while the invention is especially useful for applying concurrent patches to a logical partition manager, it is useful for applying concurrent patches to other types of code as well. Further, while the code portions typically updated are address references to replaced entry points, the same procedure could also be used for other types of updates.

What is claimed is:

1. In a computer system having a program comprising one or more object code modules residing in memory, each of said modules having one or more entry points to which said program may make address reference, said program having one or more threads of execution, a method of replacing an original version of one of said modules with a replacement version of the module concurrently with the execution of said program on said system, said method comprising the steps of:

determining, for each entry point within said original version of said module, a corresponding entry point within said replacement version of said module;

effecting a suspension of execution of said program while one or more of said threads of execution are executing in said original version of said module after having branched to said original version of said module;

during said suspension of execution of said program, replacing each address reference in said program to an entry point within said original version of said module with an address reference to the corresponding entry point within said replacement version of said module while preserving said original version of said module; and resuming execution of said program when each said address reference to an entry point within said original version of said module has been replaced with an address reference to the corresponding entry point within said replacement version of said module, whereby threads of execution that encounter a branching instruction to said module after execution is resumed branch to said replacement version of said module, while said one or more threads of execution that have branched to said original version of said module before said suspension of execution continue to execute in that version after execution is resumed.

2. The method of claim 1, comprising the further step of:

loading said replacement version of said module into said memory.

3. The method of claim 1, comprising the further steps of:

effecting a subsequent suspension of execution of said program;

during said subsequent suspension of execution of said program, replacing each address reference in said program to an entry point within said replacement version of said module with an address reference to the corresponding entry point within said original version of said module; and resuming execution of said program when each said address reference to an entry point within said replacement version of said module has been replaced with an address reference to the corresponding entry point within said original version of said module, whereby threads of execution that encounter a branching instruction to said module after execution is resumed following said subsequent suspension of execution branch to said original version of said module, while threads of execution that have branched to said replacement version of said module before said subsequent suspension of execution continue to execute in that version after execution is resumed.

4. The method of claim 3 wherein said replacing step includes the step of replacing address references in said replacement version of said module.

5. The method of claim 1 in which said program executes on a plurality of processors, said step of replacing each address reference in said program to an entry point within said original version of said module being performed on one of said processors.

\* \* \* \* \*